(12) United States Patent
Beckman et al.

(10) Patent No.: US 8,619,746 B2
(45) Date of Patent: Dec. 31, 2013

(54) CHANNEL ESTIMATION FOR MULTI-CARRIER COMMUNICATION

(75) Inventors: James Edward Beckman, La Jolla, CA (US); Joseph Chan, San Diego, CA (US); Farrokh Abrishamkar, San Diego, CA (US); Matthias Brehler, Boulder, CO (US); Michael Leviant, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 779 days.

(21) Appl. No.: 11/548,050

(22) Filed: Oct. 10, 2006

(65) Prior Publication Data

US 2008/0084817 A1    Apr. 10, 2008

(51) Int. Cl.
*H04B 7/208* (2006.01)

(52) U.S. Cl.
USPC ............................ 370/344; 370/342; 370/343

(58) Field of Classification Search
USPC ........... 370/210, 342, 343, 344; 375/344, 345
See application file for complete search history.

(56) References Cited

U.S. PATENT DOCUMENTS

| | | | |
|---|---|---|---|
| 6,972,769 B1 | 12/2005 | Nebeker et al. | |
| 7,474,611 B2 * | 1/2009 | Svensson et al. | 370/208 |
| 7,548,594 B2 * | 6/2009 | Wang | 375/316 |
| 2005/0052989 A1 * | 3/2005 | Tao et al. | 370/203 |
| 2005/0122928 A1 | 6/2005 | Vijayan et al. | |
| 2005/0157801 A1 * | 7/2005 | Gore et al. | 375/260 |
| 2005/0163257 A1 * | 7/2005 | Keerthi | 375/340 |
| 2005/0195763 A1 * | 9/2005 | Kadous et al. | 370/328 |
| 2005/0265466 A1 | 12/2005 | Wang | |
| 2005/0265490 A1 * | 12/2005 | Sestok et al. | 375/340 |
| 2007/0230635 A1 * | 10/2007 | Wilhelmsson et al. | 375/345 |
| 2009/0129489 A1 * | 5/2009 | Eldar et al. | 375/260 |

OTHER PUBLICATIONS

Bastug A et al: "Common and Dedicated Pilot-Based Channel Estimates Combining and Kalman Filtering for WCDMA Terminals" Signals, Systems and Computers, 2005. Conference Record of the Thirty-Ninth Asilomar Conference on Pacific Grove, California Oct. 28-Nov. 1,, Piscataway, NJ, USA, IEEE, Oct. 28, 2005, pp. 111-115, XP010899963 IBN: 1-4244-0131-3.
International Search Report—PCT/US07/080730, International Search Authority—European Patent Office—Feb. 20, 2008.
Written Opinion—PCT/US2007/080730, International Search Authority, European Patent Office, Feb. 20, 2008.
Taiwan Search Report—TW096137934—TIPO—Nov. 14, 2011.
Yang T., et al., "Channel estimation for OFDM transmission in multipath fading channel based on parametric channel modeling", IEEE transactions on Communications, vol. 49, No. 3, pp. 467-479, Mar. 2001.

* cited by examiner

*Primary Examiner* — Omer Mian
(74) *Attorney, Agent, or Firm* — Kevin T. Cheatham (57) ABSTRACT

Techniques for deriving a channel estimate using a scattered pilot and a continual pilot are described. The scattered pilot is sent on different sets of carriers in different symbol periods. The continual pilot is sent in each symbol period on irregularly spaced carriers. The scattered pilot is used to identify the indices of channel taps of interest, e.g., L strongest channel taps. The continual pilot is used to determine the complex gains of these L channel taps. A receiver derives a channel impulse response estimate based on received pilot symbols for the scattered pilot, identifies the L strongest channel taps, and determines the indices of these L strongest channel taps. The receiver forms a Fourier sub-matrix based on the L tap indices and determines the gains of the L channel taps based on received pilot symbols for the continual pilot and the Fourier sub-matrix.

27 Claims, 7 Drawing Sheets

CHANNEL ESTIMATION FOR MULTI-CARRIER COMMUNICATION

BACKGROUND

I. Field

The present disclosure relates generally to communication, and more specifically to techniques for performing channel estimation in wireless communication.

II. Background

A multi-carrier communication system employs multiple carriers for data transmission. These multiple carriers may be obtained via Orthogonal Frequency Division Multiplexing (OFDM), Single-Carrier Frequency Division Multiplexing (SC-FDM), or some other modulation techniques. OFDM and SC-FDM partition the system bandwidth into multiple (K) orthogonal carriers, which are also referred to as subcarriers, tones, bins, and so on. Each carrier may be modulated with data. In general, modulation symbols are sent in the frequency domain with OFDM and in the time domain with SC-FDM.

A multi-carrier system may transmit data and pilot in time-frequency units referred to as cells. A cell is one carrier in one symbol period and may be used to send one modulation symbol. A transmitter processes (e.g., encodes, interleaves, and modulates) data to generate data symbols and maps the data symbols on data cells. The transmitter typically maps pilot symbols on pilot cells that may be distributed across time and frequency. The transmitter then processes the data and pilot symbols to generate a modulated signal and further transmits the signal via a wireless channel. The wireless channel distorts the transmitted signal with a channel response and also degrades the signal with noise and interference.

A receiver receives the transmitted signal and processes the received signal to obtain received symbols. For coherent data detection, the receiver estimates the response of the wireless channel based on received pilot symbols and derives a channel estimate. The receiver then performs data detection on received data symbols with the channel estimate to obtain data symbol estimates, which are estimates of the data symbols sent by the transmitter. The receiver then processes (e.g., demodulates, deinterleaves, and decodes) the data symbol estimates to obtain decoded data.

The quality of the channel estimate has a large impact on data detection performance and affects the quality of the data symbol estimates as well as the reliability of the decoded data. This may be especially true for certain operating environments such as, e.g., high mobility scenarios where the wireless channel response may change rapidly.

There is therefore a need in the art for techniques to derive a high quality channel estimate.

SUMMARY

Techniques for deriving a channel estimate using scattered pilot and continual pilot are described herein. A scattered pilot may be sent on different sets of carriers in different symbol periods. A continual pilot may be sent in each symbol period on carriers that may be irregularly spaced. In an aspect, the scattered pilot is used to locate or identify the indices of channel taps of interest (e.g., L strongest channel taps) in a channel impulse response. The continual pilot is then used to determine the complex gains of these L channel taps.

To identify the L channel taps, received pilot symbols may be obtained on multiple sets of carriers in multiple symbol periods for the scattered pilot. The received pilot symbols may be combined in the frequency domain or time domain. A channel impulse response estimate may then be derived based on the combined pilot symbols. L strongest channel taps in the channel impulse response estimate may be identified, and the indices of these L strongest channel taps may be provided.

To determine the gains of the L channel taps, received pilot symbols may be obtained on multiple irregularly spaced carriers for the continual pilot. A Fourier sub-matrix may be determined based on the L tap indices. The gains of the L channel taps may then be determined based on the received pilot symbols and the Fourier sub-matrix, e.g., in accordance with minimum mean square error (MMSE) or least squares criterion.

Various aspects and features of the disclosure are described in further detail below.

DETAILED DESCRIPTION

The channel estimation techniques described herein may be used for various multi-carrier communication systems such as broadcast systems, cellular systems, wireless local area networks (WLANs), and so on. The terms "system" and "network" are often used interchangeably. Cellular systems may utilize Orthogonal Frequency Division Multiple Access (OFDMA), Single-Carrier FDMA (SC-FDMA), Code Division Multiple Access (CDMA), or some other multiple access techniques. These systems and networks may utilize OFDM, SC-FDM, or some other multi-carrier modulation techniques.

For clarity, the techniques are specifically described below for a broadcast system that implements Digital Video Broadcasting for Handhelds (DVB-H). DVB-H supports digital transmission of multimedia over a terrestrial communication network and utilizes OFDM. DVB-H is described in ETSI EN 300 744, entitled "Digital Video Broadcasting (DVB); Framing structure, channel coding and modulation for digital terrestrial television," November 2004, which is publicly available.

Figure 1:
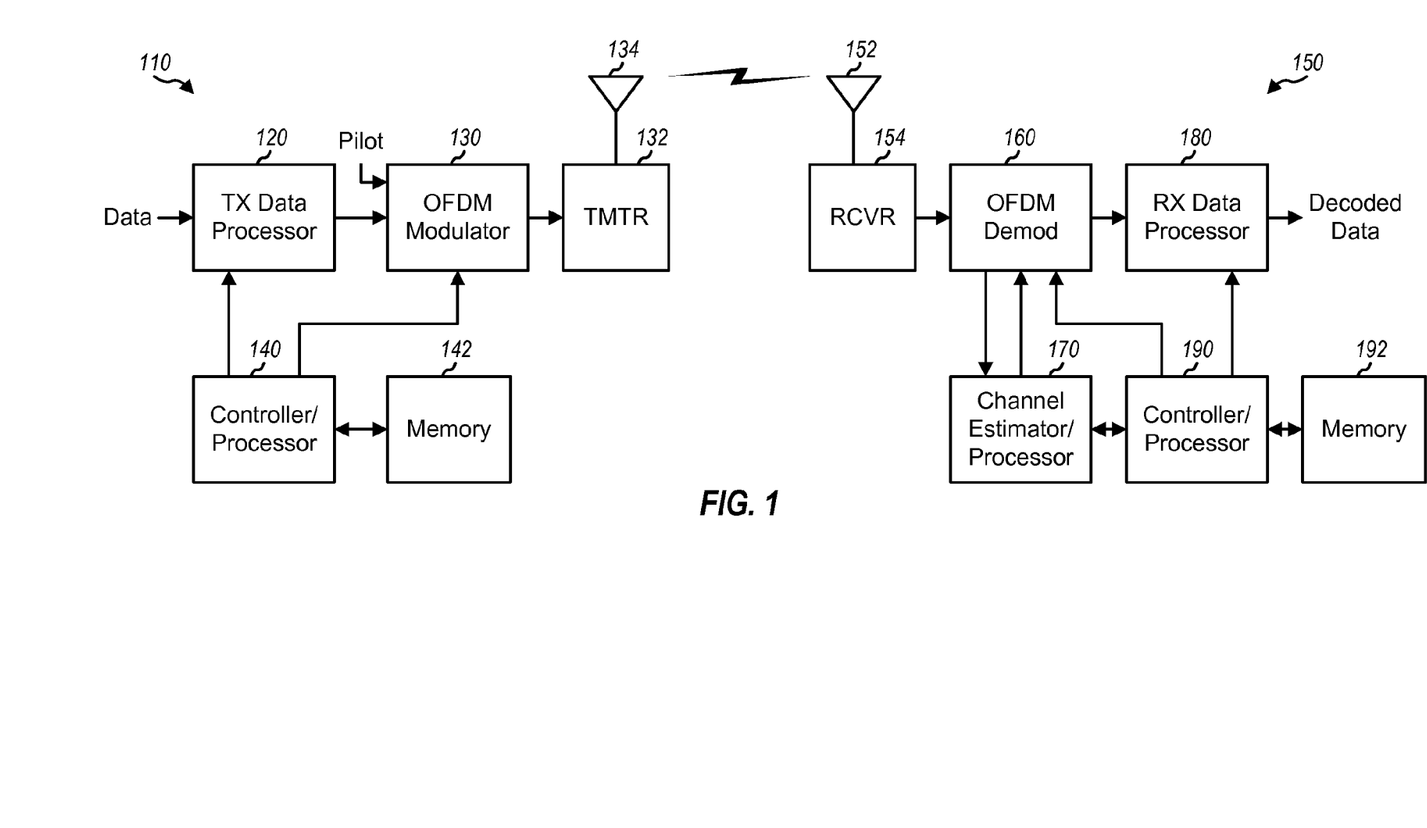
FIG. 1 shows a block diagram of a transmitter and a receiver.

FIG. 1 shows a block diagram of a transmitter 110 and a receiver 150 in a DVB-H broadcast system. At transmitter 110, a transmit (TX) data processor 120 processes (e.g., formats, encodes, interleaves, and symbol maps) data and generates data symbols. As used herein, a data symbol is a symbol for data, a pilot symbol is a symbol for pilot, a zero symbol is a signal value of zero, and a symbol is typically a complex value. The data symbols and pilot symbols may be modulation symbols from a modulation scheme such as PSK or QAM. Pilot is data that is known a priori by both the transmitter and the receiver.

An OFDM modulator 130 receives the data and pilot symbols, maps the data symbols to data cells, and maps the pilot symbols to pilot cells, as described below. A data cell is a cell used to send data, and a pilot cell is a cell used to send pilot. A given carrier may serve as a data cell in one OFDM symbol period and as a pilot cell in another OFDM symbol period. An OFDM symbol period is the duration of one OFDM symbol and is also referred to as a symbol period. OFDM modulator 130 obtains K output symbols for the K total carriers in each OFDM symbol period. Each output symbol may be a data symbol, a pilot symbol, or a zero symbol. OFDM modulator 130 transforms the K output symbols for each OFDM symbol period with an inverse fast Fourier transform (IFFT) or an inverse discrete Fourier transform (IDFT) to obtain K time-domain chips. OFDM modulator 130 then repeats G time-domain chips to generate an OFDM symbol containing K+G chips. The repeated portion is referred to as a guard interval or a cyclic prefix and is used to combat frequency selective fading. OFDM modulator 130 provides an OFDM symbol in each OFDM symbol period. A transmitter unit (TMTR) 132 receives and processes (e.g., converts to analog, amplifies, filters, and frequency upconverts) the OFDM symbols and generates a modulated signal, which is transmitted via an antenna 134.

At receiver 150, an antenna 152 receives the modulated signal from transmitter 110 and provides a received signal. A receiver unit (RCVR) 154 conditions (e.g., filters, amplifies, frequency downconverts, and digitizes) the received signal and provides samples. An OFDM demodulator (Demod) 160 processes the samples as described below to obtain K received symbols for the K total carriers in each OFDM symbol period. A channel estimator/processor 170 performs channel estimation based on the received pilot symbols and provides a channel estimate. OFDM demodulator 160 performs data detection on the received data symbols with the channel estimate and provides data symbol estimates. A receive (RX) data processor 180 then processes (e.g., symbol demaps, deinterleaves, and decodes) the data symbol estimates and provides decoded data. In general, the processing by OFDM demodulator 160 and RX data processor 180 is complementary to the processing by OFDM modulator 130 and TX data processor 120, respectively, at transmitter 110.

Controllers/processors 140 and 190 control the operation of various processing units at transmitter 110 and receiver 150, respectively. Memories 142 and 192 store data and program codes for transmitter 110 and receiver 150, respectively.

DVB-H has 3 modes of operation for fast Fourier transform (FFT) sizes of 2K, 4K and 8K. Table 1 lists some parameters for DVB-H and provides their values for the three operating modes. In Table 1, parameters N, K, S and C are given for one OFDM symbol and are dependent on the operating mode. The carrier spacing in Table 1 is for 8 MHz channel. DVB-H may be configured for 5, 6, 7, or 8 MHz channel, each of which is associated with different carrier spacing.

TABLE 1

|  |  | Mode | | |
| --- | --- | --- | --- | --- |
| Description | Notation | 2K | 4K | 8K |
| Carrier spacing (in KHz) |  | 4.4643 | 2.2321 | 1.1161 |
| FFT size | N | 2048 | 4096 | 8192 |
| Total number of carriers | K | 1705 | 3409 | 6817 |
| Number of scattered pilot carriers | S | 142 | 284 | 568 |
| Number of continual pilot carriers | C | 45 | 89 | 177 |

Figure 2:
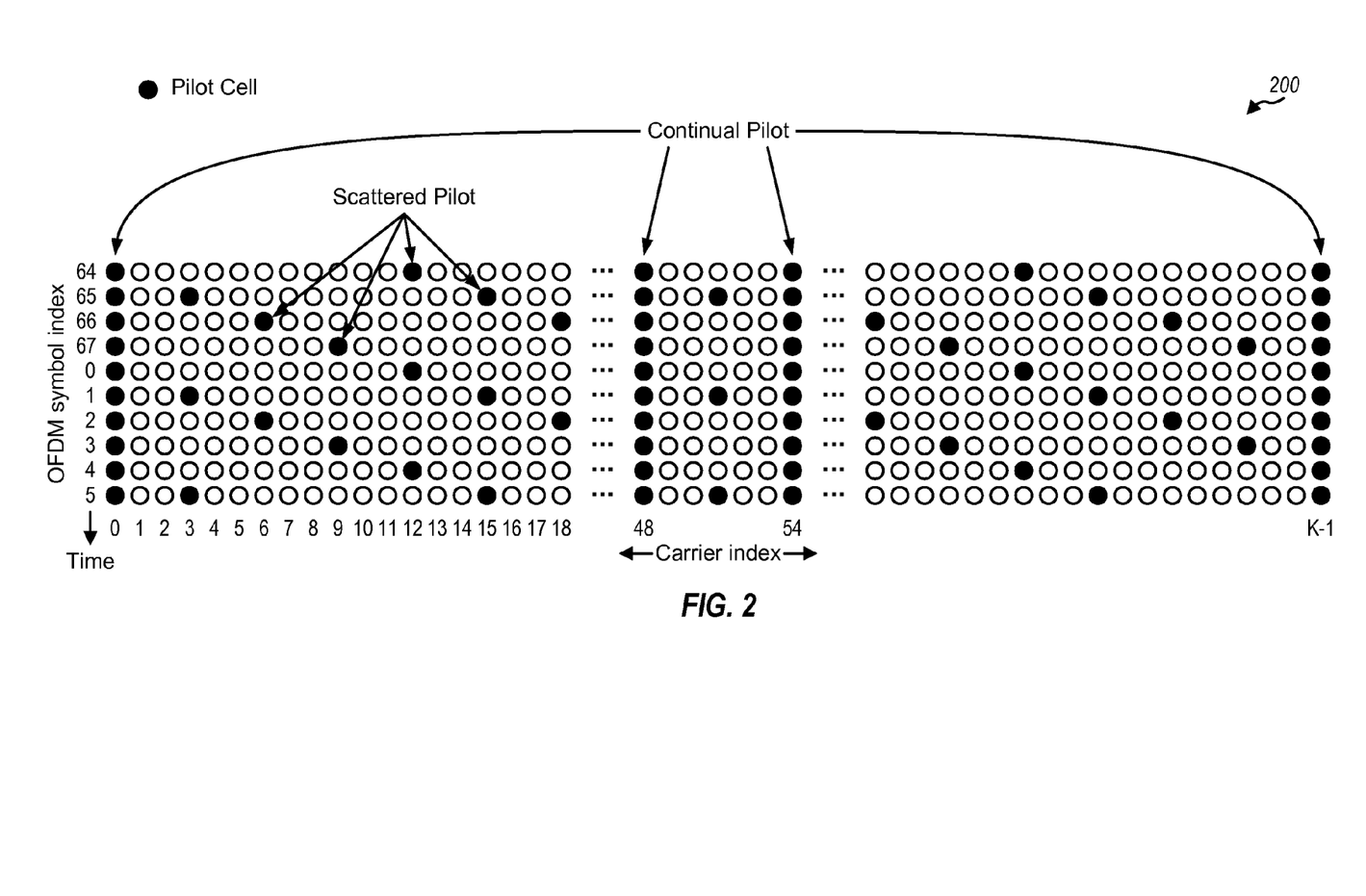
FIG. 2 shows a scattered pilot and a continual pilot in DVB-H.

FIG. 2 shows a carrier structure 200 for DVB-H. The overall system bandwidth of BW MHz is partitioned into multiple (K) carriers that are given indices of 0 through K−1, where K is a configurable value and given in Table 1. The spacing between carriers is BW/K.

FIG. 2 also shows a pilot structure for DVB-H, which includes a continual pilot and a scattered pilot. The continual pilot is sent on C carriers that are distributed across the K total carriers, where C is dependent on the operating mode. The continual pilot is sent on the same C carriers in each OFDM symbol period. These C carriers include carriers 0, 48, 54, etc., which are given in ETSI EN 300 744.

The scattered pilot is sent on one of four interlaces in each OFDM symbol period. Each interlace contains approximately K/12 carriers that are uniformly/regularly spaced apart by 12 carriers. Interlace m, for m∈{0, 1, 2, 3}, contains carriers 3m, 3m+12, 3m+24, etc., where 3m is a pilot offset as well as the index of the first carrier in the interlace. Thus, interlace 0 contains carriers 0, 12, 24, etc., interlace 1 contains carriers 3, 15, 27, etc., interlace 2 contains carriers 6, 18, 30, etc., and interlace 3 contains carriers 9, 21, 33, etc. K is not an integer multiple of 12, and interlace 0 contains one more scattered pilot carrier than interlaces 1, 2 and 3. For simplicity, the following description assumes that all four interlaces contain the same number of (S) scattered pilot carriers.

The transmission timeline for DVB-H is partitioned into frames, with each frame including 68 OFDM symbols that are given indices of 0 through 67. The scattered pilot is sent on interlace m=(n mod 4) in OFDM symbol period n, for n=0, . . . , 67, where "mod" denotes a modulo operation. The scattered pilot cycles through the four interlaces in each 4-symbol interval.

As shown in FIG. 2, the scattered pilot samples the wireless channel regularly in both time and frequency. The sampling interval in frequency determines the maximum time span of a channel impulse response. For example, if there is a pilot symbol on every third carrier, then the impulse response of the wireless channel may be estimated unambiguously for ⅓ of the useful OFDM symbol duration, or K/3 sample periods. The sampling interval in time determines the maximum rate of change for which the wireless channel response may be reconstructed in time. For example, if a pilot symbol is sent on a given carrier in every 4 OFDM symbol periods, then this pilot spacing theoretically supports a maximum rate of change of $1/(4 \cdot T_S)/2$ in the wireless channel, where $T_S$ is one OFDM symbol period. This equates to approximately 112 Hz for the 8K mode with ¼ guard interval in an 8 MHz channel. The maximum rate of change of a wireless channel corresponds to the maximum Doppler frequency. A Doppler frequency of 112 Hz corresponds to approximately 100 miles/hour (mph). The practical maximum supported Doppler frequency may be only a fraction (e.g., about half) of the theoretical value due to implementation constraints. A maximum Doppler frequency corresponding to 50 mph may be insufficient for many applications.

A time-domain channel impulse response is composed of a number of (T) channel taps at tap indices 0 through T−1, where T may be any value. Each channel tap is associated with (1) a specific tap index that corresponds to a specific propagation delay and (2) a specific complex gain that is determined by the wireless environment. At high mobility, the scattered pilot is insufficiently sampled in time and may cause the channel taps to alias. A true channel tap at a given tap index may then have alias images at other tap indices. These alias images are indistinguishable from the true channel taps at these other tap indices and act as noise that may degrade performance.

Techniques for deriving a channel estimate using both the scattered pilot and continual pilot are described herein. In an aspect, the scattered pilot is used to locate or identify the indices of channel taps of interest, e.g., L strongest channel taps, where L may be any value. The continual pilot is then used to determine the complex gains of these L channel taps. As shown in FIG. 2, the continual pilot is sent in each symbol period. This pilot spacing supports a higher maximum Doppler frequency than the scattered pilot. Furthermore, the irregular spacing of the continual pilot carriers across frequency is exploited to obtain higher quality for the channel estimate.

Figure 3:
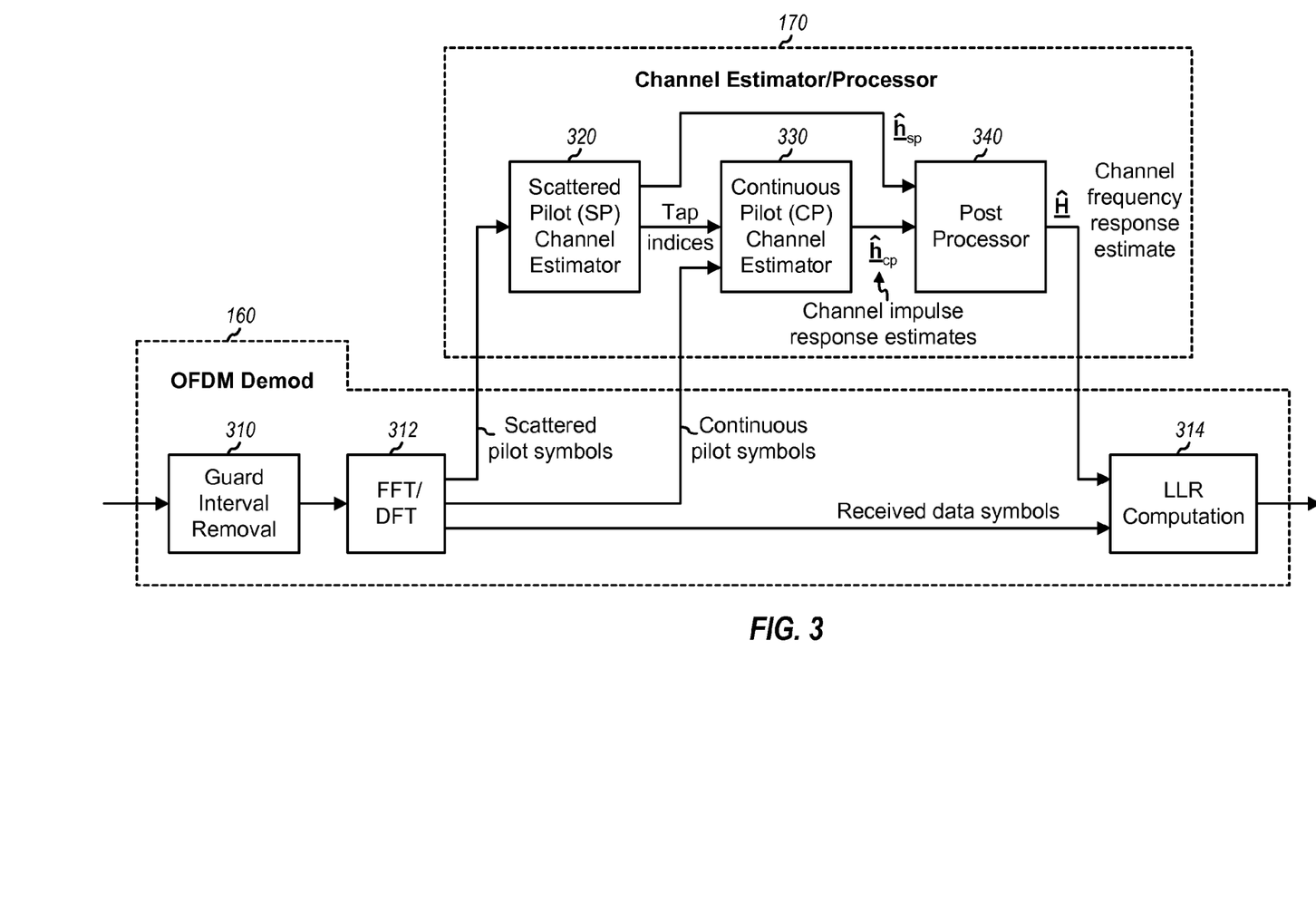
FIG. 3 shows a block diagram of an OFDM demodulator and a channel estimator/processor at the receiver.

FIG. 3 shows a block diagram of a design of OFDM demodulator 160 and channel estimator/processor 170 in FIG. 1. Within OFDM demodulator 160, a guard interval removal unit 310 receives the samples from receiver unit 154, removes the guard interval in each OFDM symbol, and provides K samples for the OFDM symbol. An FFT/DFT unit 312 performs an FFT or DFT on the samples for each OFDM symbol period to obtain K received symbols for the K total carriers. Unit 312 provides received pilot symbols for the scattered pilot (or scattered pilot symbols) to a scattered pilot (SP) channel estimator 320, received pilot symbols for the continual pilot (or continual pilot symbols) to a continual pilot (CP) channel estimator 330, and received data symbols to a log-likelihood ratio (LLR) computation unit 314.

SP channel estimator 320 derives a channel impulse response estimate based on the scattered pilot, as described below, and provides the indices of L selected channel taps. CP channel estimator 330 determines the complex gains of the L selected channel taps based on the continual pilot. CP channel estimator 330 provides a channel impulse response estimate with L non-zero channel taps, which are located at the indices determined by the scattered pilot and have complex gains determined by the continual pilot. A post processor 340 derives a channel frequency response estimate having a channel gain for each carrier of interest, e.g., each data carrier. Unit 314 then computes the LLRs of code bits based on the received data symbols and the channel frequency response estimate.

SP channel estimator 320 may derive a channel impulse response estimate based on the scattered pilot in various manners. For example, the Q scattered pilot interlaces may be combined in the frequency domain, and the combined pilot symbols may be used to derive a channel impulse response estimate. In general, Q may be any value such as 7, 15, and so on.

Figure 4:
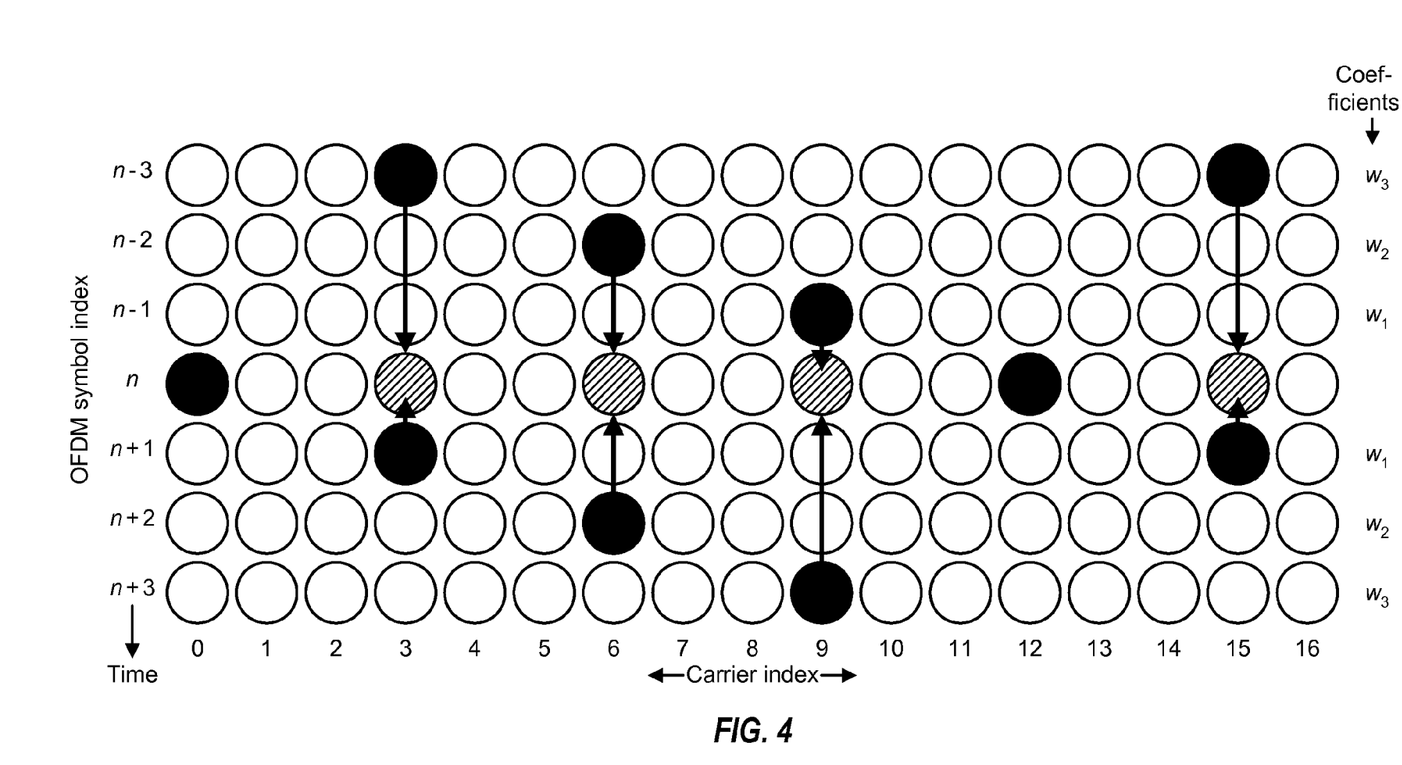
FIG. 4 shows combining of scattered pilot interlaces in the frequency domain.

FIG. 4 shows a scheme for combining Q=7 scattered pilot interlaces in the frequency domain. In each symbol period n, 7 interlaces for symbol periods n−3 through n+3 are combined to obtain combined pilot symbols for 4S pilot carriers that are spaced apart by three carriers. In the example shown in FIG. 4, interlace 0 is used in symbol period n. The pilot symbols for interlace 1 in symbol periods n−3 and n+1 are combined, the pilot symbols for interlace 2 in symbol periods n−2 and n+2 are combined, and the pilot symbols for interlace 3 in symbol periods n−1 and n+3 are combined. In general, the pilot symbols for symbol periods n−4+i and n+i may be combined, for i=1, 2, 3. The received pilot symbols for symbol period n may be used directly.

Figure 5:
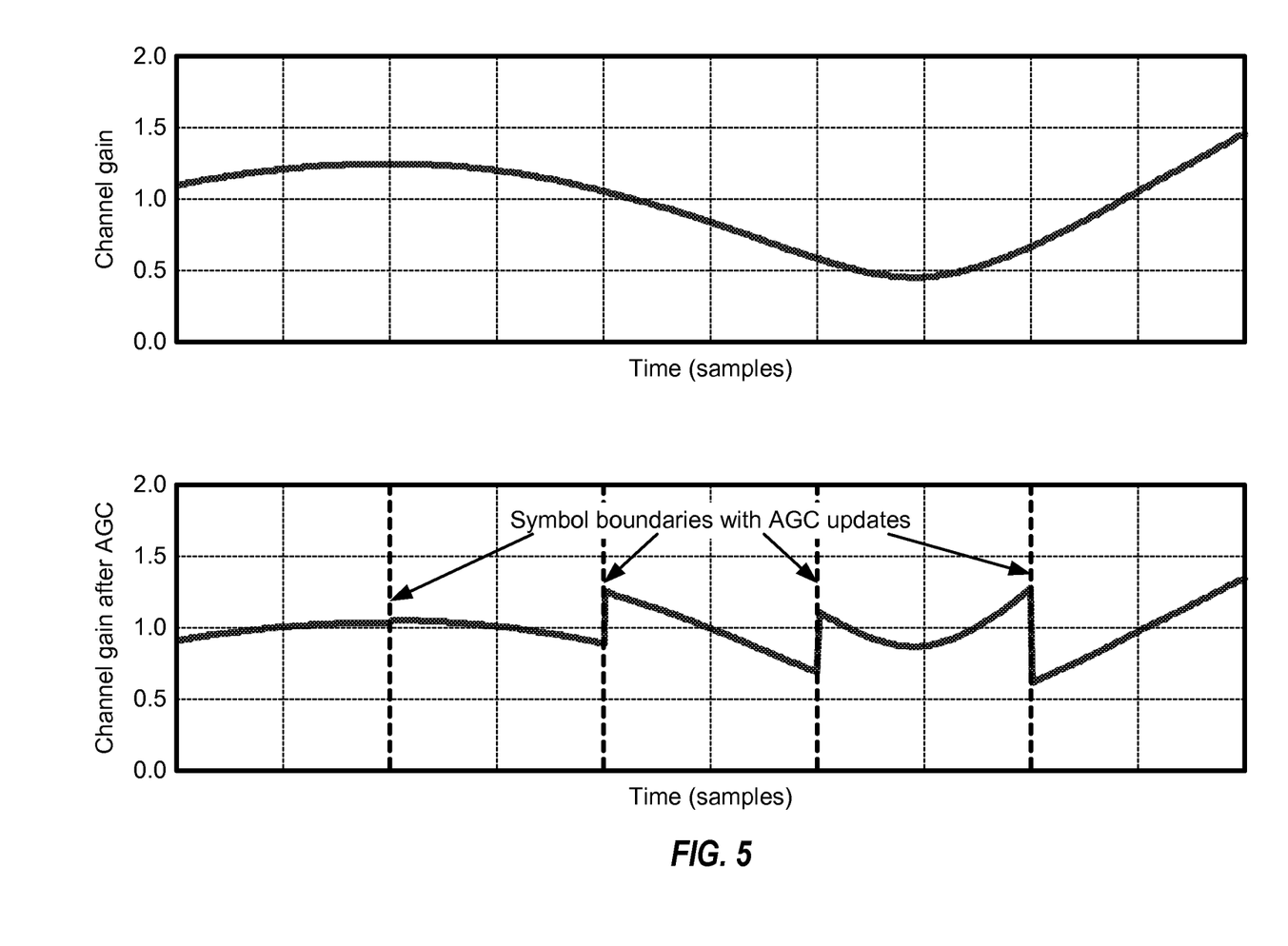
FIG. 5 shows the effect of AGC on channel estimation.

FIG. 5 shows the effect of automatic gain control (AGC) on channel estimation. The AGC may adjust the gain of receiver unit 154 such that the samples for each OFDM symbol have approximately constant power. The top plot in FIG. 5 shows the channel gain of a smoothly changing channel. The lower plot in FIG. 5 shows the effect of AGC, which chops up the smoothly changing channel into pieces with discontinuities at symbol boundaries when the receiver gain is adjusted. Performance may improve if the effect of the AGC is reversed when combining the interlaces.

A received pilot symbol may be expressed as:

$$P_k(n) = g(n) \cdot [H_k(n) + \eta_k(n)], \quad \text{Eq (1)}$$

where
$P_k(n)$ is a received pilot symbol on carrier k in symbol period n,
$g(n)$ is a receiver gain for symbol period n,
$H_k(n)$ is a channel gain for carrier k in symbol period n, and
$\eta_k(n)$ is noise on carrier k in symbol period n.

The interlace combining may be performed as follows:

$$P'_k(n) = \frac{g(n)}{g(n-4+i)} \cdot w_{4-i} \cdot P_k(n-4+i) + \frac{g(n)}{g(n+i)} \cdot w_i \cdot P_k(n+i), \quad \text{Eq (2)}$$

for $i = 1, 2, 3,$ where $w_1$, $w_2$ and $w_3$ are coefficients used for interlace combining, and
$P'_k(n)$ is a combined pilot symbol for carrier k in symbol period n.

In equation (2), the ratios $g(n)/g(n+i)$ and $g(n)/g(n-4+i)$ remove the effect of AGC. The coefficients $w_1$, $w_2$ and $w_3$ determine the weights to apply to the interlaces being combined. As shown in FIG. 4, coefficient $w_1$ is used for symbol periods n−1 and n+1, coefficient $w_2$ is used for symbol periods n−2 and n+2, and coefficient $w_3$ is used for symbol periods n−3 and n+3. The coefficients may be determined based on MMSE, least squares, or some other criterion. The coefficients may also be determined based on linear interpolation so that $w_1 = 0.25$, $w_2 = 0.5$, and $w_3 = 0.75$ for Q=7. Coefficient pair (0.75, 0.25) is used for symbol periods n−3 and n+1, coefficient pair (0.5, 0.5) is used for symbol periods n−2 and n+2, and coefficient pair (0.25, 0.75) is used for symbol periods n−1 and n+3.

The interlace combining provides 4S combined pilot symbols for 4S carriers in symbol period n. Zero padding may then be performed to obtain N/2 total symbols composed of 4S pilot symbols followed by N/2-4S zero symbols, e.g., 4096 total symbols composed of 2272 pilot symbols followed by 1824 zero symbols for the 8K mode. An IFFT may then be performed on the N/2 total symbols to obtain N/2 time-domain channel taps. In one design, the N/2 time-domain channel taps are provided directly as a channel impulse response estimate $\hat{h}_{sp}(n)$ from the scattered pilot. In another design, the N/2 time-domain channel taps are filtered across symbol periods, e.g., on a per-tap basis with an infinite impulse response (IIR) filter, to obtain N/2 filtered channel taps that are then provided as $\hat{h}_{sp}(n)$. In any case, $\hat{h}_{sp}(n)$ is a vector containing N/2 channel taps.

The Q scattered pilot interlaces may also be combined in the time domain. In each symbol period n, the S received pilot symbols may be zero filled to obtain N/8 symbols, e.g., 1024 total symbols composed of 568 pilot symbols followed by 456 zeros for the 8K mode. An IFFT may then be performed on the N/8 total symbols to obtain an initial channel impulse response estimate $\hat{h}_{init}(n)$ with N/8 channel taps. A phase ramp may then be applied, as follows:

$$\hat{h}_{pr,l}(n) = \hat{h}_{init,l}(n) \cdot e^{j\frac{2\pi \cdot l \cdot (n \bmod 4)}{N/2}}, \quad \text{Eq (3)}$$

where $\hat{h}_{init,l}(n)$ is a channel tap at index l in $\hat{h}_{init}(n)$, and
$\hat{h}_{pr,l}(n)$ is a corresponding channel tap after applying the phase ramp.

The channel impulse response estimate $\hat{h}_{sp}(n)$ may then be obtained by repeating the phase-ramped channel impulse response estimate and filtering across Q symbol periods (e.g., symbol periods n−3 through n+3), as follows:

$$\hat{h}_{sp,l+m\cdot N/8}(n) = \sum_{i=-\lfloor Q/2 \rfloor}^{\lfloor Q/2 \rfloor} c_{i,l} \cdot \hat{h}_{pr,l}(n+i) \cdot e^{j\frac{\pi}{2}m\cdot[(n+i) \bmod 4]}, \quad \text{Eq (4)}$$

for $m = 0, \ldots, 3$, where $c_{i,l}$ is a filter coefficient for tap index l at symbol offset i,
$\hat{h}_{sp,l+m\cdot N/8}(n)$ is a channel tap at index $l+m \cdot N/8$ in $\hat{h}_{sp}(n)$, and
$\lfloor \ \rfloor$ is a floor operator.

The filter coefficients $c_{i,l}$ may be selected to achieve the desired filtering.

SP channel estimator 320 may also derive the channel impulse response estimate $\hat{h}_{sp}(n)$ based on the scattered pilot in other manners. $\hat{h}_{sp}(n)$ may contain N/2 channel taps, e.g., 4096 channel taps for the 8K mode. In one design, SP channel estimator 320 identifies L strongest channel taps in $\hat{h}_{sp}(n)$ and provides the indices of these L channel taps. In another design, SP channel estimator 320 identifies channel taps with magnitude exceeding a predetermined threshold and provides their indices. In yet another design, SP channel estimator 320 identifies candidate channel taps with magnitude exceeding the predetermined threshold and then selects the L strongest channel taps among the candidate channel taps. The tap selection may also be performed in other manners. The following description is for the design in which SP channel estimator 320 provides L tap indices of the L strongest channel taps. The tap selection may be performed in each symbol period, in every other symbol period, or at some other interval.

CP channel estimator 330 may derive a channel impulse response estimate based on the continual pilot in various manners. The received pilot symbols for the continual pilot in one symbol period may be expressed as:

$$\underline{b} = \underline{W}\underline{h} + \underline{n}, \quad \text{Eq (5)}$$

where
h is an L×1 vector of channel taps for the wireless channel,
W is a C×L Fourier sub-matrix for the L selected tap indices,
n is a C×1 vector of noise, and
b is a C×1 vector of received pilot symbols on C carriers for the continual pilot.

For simplicity, the noise may be assumed to be additive white Gaussian noise (AWGN) with a zero mean vector and a covariance matrix of $\sigma_n^2 I$, where $\sigma_n^2$ is the variance of the noise, and I is the identity matrix with ones along the diagonal and zeros elsewhere. For clarity, symbol period index n is omitted from equation (5).

A Fourier matrix F with N/2 rows and N/2 columns may be used for an N/2-point DFT. A Fourier matrix may also be referred to as a DFT matrix or some other terminology. Element $W_{u,v}$ in row u and column v of F may be expressed as:

$$W_{u,v} = e^{-2\pi \cdot \frac{u \cdot v}{N/2}}, \quad \text{Eq (6)}$$

for $u = 0, \ldots, N/2 - 1$ and $v = 0, \ldots, N/2 - 1$.

The continual pilot is sent on C carriers with indices that are multiple integer of three. The actual carrier indices may be divided by three to obtain divided indices that fall within a range of 0 to N/2−1. For example, the divided indices run from 0 to 2272 for the 8K mode and are within the range of 0 to 4095. Each row of the Fourier matrix F corresponds to a different carrier index, and each column of F corresponds to a different tap index. The Fourier sub-matrix W is a sub-matrix of F and includes C rows of F corresponding to the C divided indices for the continual pilot and L columns of F corresponding to the L selected tap indices. W is thus dependent on the selected tap indices and may change from symbol period to symbol period since different tap indices may be selected.

In equation (5), vector b is known from the received pilot symbols, matrix W is determined based on the L selected tap indices, and vector h is unknown. Vector h may be solved using MMSE, least squares, or some other techniques.

h may be determined based on an MMSE solution, as follows:

$$\underline{h} = R_{hh}\underline{W}^H(\underline{W}R_{hh}\underline{W}^H + \sigma_n^2 I)^{-1}\underline{b} \quad \text{Eq (7)}$$

where
$R_{hh} = E\{\underline{h}\underline{h}^H\}$ is a covariance matrix of h,
$E\{\ \}$ is an expectation operation, and
"H" denotes a conjugate transpose.

For simplicity, the channel taps may be assumed to be independently and identically distributed (i.i.d.) so that $R_{hh} = I$. Equation (7) may then be expressed as:

$$\underline{h} = (\underline{W}^H\underline{W} + \sigma_n^2 I)^{-1}\underline{W}^H\underline{b}. \quad \text{Eq (8)}$$

h may also be determined based on a least squares solution, as follows:

$$\underline{h} = (\underline{W}^H\underline{W})^{-1}\underline{W}^H\underline{b}. \quad \text{Eq (9)}$$

The least squares solution is similar to the MMSE solution but omits the noise covariance $\sigma_n^2 I$.

Equations (8) and (9) may be rewritten to avoid the matrix inversion, as follows:

$$\underline{y} = \underline{A}\underline{h} = \underline{W}^H\underline{b}, \quad \text{Eq (10)}$$

where $$\underline{A} = \begin{cases} \underline{W}^H\underline{W} + \sigma_n^2 I & \text{for the } MMSE \text{ solution} \\ \underline{W}^H\underline{W} & \text{for the least squares solution.} \end{cases}$$

For both the MMSE and least squares solutions, h may be solved iteratively. The vectors and variables used to solve for h may be initialized as follows:

$$\underline{h}_0 = 0,$$

$$\underline{r}_0 = \underline{W}^H\underline{b},$$

$$\underline{p}_0 = \underline{r}_0, \text{ and}$$

$$\rho_0 = \|\underline{r}_0\|^2. \quad \text{Eq (11)}$$

$h_0$ may also be set to the channel impulse response estimate obtained from a prior symbol period.

The following computation may then be performed for each iteration i, for $i=1, 2, \ldots, I$, where I may be a suitably selected value.

$$\underline{w}_i = \underline{A}\underline{p}_{i-1}, \quad \text{Eq (12)}$$

-continued $$\alpha_i = \frac{\rho_{i-1}}{\underline{p}_{i-1}^H \underline{w}_i},$$

$$\underline{h}_i = \underline{h}_{i-1} + \alpha_i \underline{p}_{i-1},$$

$$\underline{r}_i = \underline{r}_{i-1} - \alpha_i \underline{w}_i,$$

$$\rho_i = \|\underline{r}_i\|^2,$$

$$\beta_i = \frac{\rho_i}{\rho_{i-1}},$$

and $$\underline{p}_i = \underline{r}_i + \beta_i \underline{p}_{i-1}.$$

After I iterations are completed, $\underline{h}_i$ is the final solution for h and is provided as a channel impulse response estimate $\hat{\underline{h}}_{cp}(n)$ from the continual pilot. $\hat{\underline{h}}_{cp}(n)$ is a vector containing L channel taps for the L selected tap indices.

Matrix A is computed once and used for all iterations. Direct computation of A would require L·L·C complex multiplies, which may be a large number of multiplies. To avoid direct computation of A, a Fourier sub-matrix D with C rows and N/2 columns may be defined. D contains C rows of the Fourier matrix F corresponding to the C divided indices for the continual pilot and all N/2 columns of F for all N/2 possible tap indices. A correlation matrix $\underline{R}_{cp}$ may be defined as:

$$\underline{R}_{cp} = \underline{D}^H \underline{D}. \quad \text{Eq (13)}$$

The elements of $\underline{W}^H \underline{W}$ may be taken from $\underline{R}_{cp}$. $\underline{R}_{cp}$ has a dimension of N/2 by N/2 but is Toeplitz so that there are only N/2 unique elements. Furthermore, $\underline{R}_{cp}$ is symmetric so that in the first row, the element in column v is equal to the element in column N/2-v. Hence, $\underline{R}_{cp}$ has only N/4-1 unique elements, which may be pre-computed and stored in memory. Thereafter, in each symbol period, the memory may be accessed to obtain the elements of $\underline{W}^H \underline{W}$, which may be used to derive A.

For the 2K mode, the continual pilot is sent on the following 45 carriers: 0, 48, 54, 87, 141, 156, 192, 201, 255, 279, 282, 333, 432, 450, 483, 525, 531, 618, 636, 714, 759, 765, 780, 804, 873, 888, 918, 939, 942, 969, 984, 1050, 1101, 1107, 1110, 1137, 1140, 1146, 1206, 1269, 1323, 1377, 1491, 1683 and 1704. For the 8K mode, a 44-carrier pattern (with carriers 48 through 1704) is repeated starting at carriers 1752, 3456 and 5160, as described in ETSI EN 300 744. The C carriers for the continual pilot are thus spaced irregularly across the K total carriers. This irregular spacing improves the rank of $\underline{W}$ and allows for estimation of a channel impulse response with a long delay spread. If the continual pilot were regularly/uniformly spaced, then the rank of $\underline{W}$ would decrease, which may then degrade the channel impulse response estimate.

The carriers for the continual pilot (or CP carriers) are spaced apart by as much 192 carriers and as little as 3 carriers. The carriers for the scattered pilot (or SP carriers) are uniformly spaced across the K total carriers. Some SP carriers may be used to augment the CP carriers in places where the CP carriers are sparse. Vector b may then include C received pilot symbols for the continual pilot as well as some received pilot symbols for the scattered pilot. Matrix W would then be formed based on the CP carriers and SP carriers covered by vector b.

Post-processor 340 may receive the channel impulse response estimate $\hat{\underline{h}}_{sp}(n)$ from SP channel estimator 320 and the channel impulse response estimate $\hat{\underline{h}}_{cp}(n)$ from CP channel estimator 330. Post-processor 340 may derive a channel frequency response estimate $\hat{\underline{H}}(n)$ based on $\hat{\underline{H}}_{cp}(n)$ or $\hat{\underline{h}}_{sp}(n)$.

$\hat{H}(n)$ may be derived based on $\hat{h}_{cp}(n)$ in various manners. In one design, an N/2×1 vector $\hat{\underline{h}}_1(n)$ is formed with the L channel taps in $\hat{\underline{h}}_{cp}(n)$ at the L selected tap indices and N/2-L zeros at other tap indices. In another design, $\hat{\underline{h}}_1(n)$ is formed with the L channel taps in $\hat{\underline{h}}_{cp}(n)$ at the L selected tap indices and N/2-L channel taps in $\hat{\underline{h}}_{sp}(n)$ at other tap indices. In both designs, $\hat{\underline{h}}_1(n)$ is obtained based on received pilot symbols from pilot carriers with indices that are multiples of three. Interpolation may be performed in the time domain or frequency domain to obtain channel gains for all K total carriers.

In one design, a 3N/2×1 vector $\hat{\underline{h}}(n)$ is formed with the N/2 channel taps in $\hat{\underline{h}}_1(n)$ followed by N zeros. A DFT is then performed on $\hat{\underline{h}}(n)$ to obtain 3N/2 channel gains. The first K channel gains are selected and provided as the channel gains for the K total carriers in $\hat{H}(n)$.

In another design, N/2×1 vectors $\hat{\underline{h}}_2(n)$ and $\hat{\underline{h}}_3(n)$ are formed by applying different phase ramps to the N/2 elements in $\hat{\underline{h}}_1(n)$, as follows:

$$\hat{h}_{q,l}(n) = \hat{h}_{1,l}(n) \cdot e^{-j2\pi \cdot q \cdot l/N}, \text{ for } q=2, 3, \quad \text{Eq (14)}$$

where $\hat{h}_{1,l}(n)$ is the l-th channel tap in $\hat{\underline{h}}_1(n)$, and $\hat{h}_{q,l}(n)$ is the l-th channel tap in $\hat{\underline{h}}_q(n)$, for q=2, 3. The phase ramp is applied to only the L non-zero channel taps in $\hat{\underline{h}}_1(n)$. Three N/2-point FFTs may then be performed on $\hat{\underline{h}}_1(n)$, $\hat{\underline{h}}_2(n)$ and $\hat{\underline{h}}_3(n)$ to obtain $\hat{H}_1(n)$, $\hat{H}_2(n)$, and $\hat{H}_3(n)$, respectively, each containing N/2 channel gains. The K channel gains in $\hat{H}(n)$ may be obtained by cycling through $\hat{H}_1(n)$, $\hat{H}_2(n)$, and $\hat{H}_3(n)$ and, in each cycle, obtaining one channel gain from each of $\hat{H}_1(n)$, $\hat{H}_2(n)$, and $\hat{H}_3(n)$.

In yet another design, interpolation or resampling is performed on the N/2 channel taps in $\hat{\underline{h}}_1(n)$ to obtain N/3 resampled channel taps. Again, most of the elements of $\hat{\underline{h}}_1(n)$ will be zero. The N/3 resampled channel taps are zero-padded to length N and then transformed with an N-point FFT to obtain N channel gains. The first K channel gains are provided as the channel gains for the K total carriers in $\hat{H}(n)$.

$\hat{H}(n)$ may also be derived from $\hat{\underline{h}}_{sp}(n)$, e.g., in similar manner as $\hat{\underline{h}}_{cp}(n)$. The channel gains for the data carriers may be obtained from $\hat{H}(n)$ and used for data detection, e.g., equalization, matched filtering, or LLR computation of the received data symbols. $\hat{\underline{h}}_{sp}(n)$ or $\hat{\underline{h}}_{cp}(n)$ may also be used for time tracking and/or other purposes.

In one design, a channel estimate derived from either the scattered pilot or the continual pilot may be selected for use in a given symbol period. The selection may be based on various factors such as operating mode, channel conditions, and so on. For example, $\hat{\underline{h}}_{cp}(n)$ may be used for the 4K and 8K modes, for fast fading channels due to high mobility, for channels with large delay spread, and so on, or a combination thereof. The ability of $\hat{\underline{h}}_{cp}(n)$ to track rapid channel changes may make the 8K mode in DVB-H more suitable for mobile applications. $\hat{\underline{h}}_{sp}(n)$ may be used when the condition(s) for using $\hat{\underline{h}}_{cp}(n)$ are not satisfied.

The number of channel taps (L) may be selected based on a tradeoff between computational complexity and channel estimation performance. More channel taps increase the dimensions of the vectors and matrices used to compute for h. The number of channel taps is also limited by the number of received pilot symbols in b. In one design, L is a fixed value that is selected to provide good performance, e.g., L≤50. In another design, L is a configurable value that may be dependent on the operating mode, the number of received pilot symbols in b, and/or other factors. For example, L may be smallest for the 2K mode, larger for the 4K mode, and largest for the 8K mode.

Figure 6:
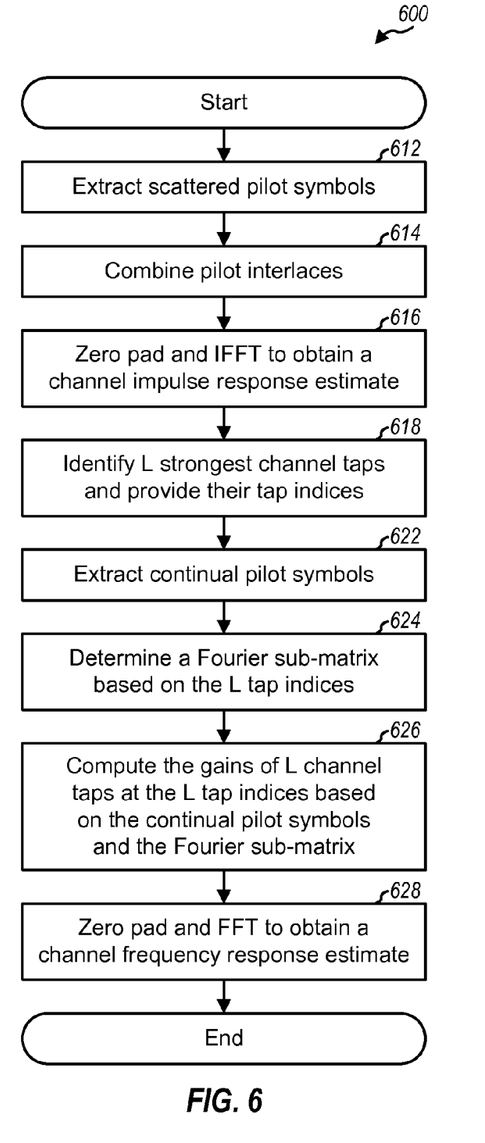
FIG. 6 shows a process for performing channel estimation with the scattered pilot and continual pilot.

FIG. 6 shows a process 600 for deriving a channel estimate with the scattered pilot and continual pilot. Scattered pilot symbols are extracted from cells used for the scattered pilot (block 612). Q pilot interlaces are combined, e.g., in the frequency domain as shown in equation (2) (block 614). The combined pilot symbols are zero padded and transformed with an IFFT to obtain a channel impulse response estimate (block 616). The L strongest channel taps in the channel impulse response estimate are identified, and their tap indices are provided (block 618). Continual pilot symbols are extracted from cells used for the continual pilot (block 622). A Fourier sub-matrix is determined based on the L tap indices (block 624). The gains of L channel taps at the L tap indices are computed based on the continual pilot symbols and the Fourier sub-matrix, e.g., using MMSE or least squares criterion (block 626). The L gains are zero padded and transformed with an FFT to obtain a channel frequency response estimate (block 628).

Figure 7:
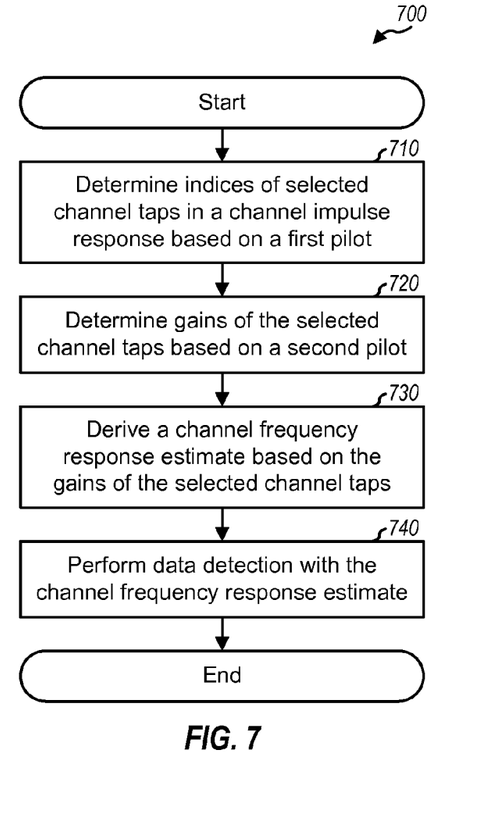
FIG. 7 shows a process for performing channel estimation.

FIG. 7 shows a process 700 for performing channel estimation. The indices of selected channel taps in a channel impulse response are determined based on a first pilot (block 710). The selected channel taps are a subset of all possible channel taps in the channel impulse response. The gains of the selected channel taps are determined based on a second pilot (block 720). The first pilot may comprise a scattered pilot sent on multiple interlaces, one interlace in each symbol period, with each interlace corresponding to a different set of carriers. The second pilot may comprise a continual pilot sent in each symbol period on multiple carriers that are irregularly spaced. The second pilot may also comprise a portion of the scattered pilot sent on regularly spaced carriers. The first and/or second pilot may also comprise carriers carrying known data. A channel frequency response estimate may be derived based on the gains of the selected channel taps (block 730). Data detection is then performed with the channel frequency response estimate (block 740).

A first channel impulse response estimate may be derived based on the first pilot. A second channel impulse response estimate may be derived based on the gains of the selected channel taps. The first or second channel impulse response estimate may be selected for use based on operating mode, channel conditions, or a combination thereof.

Figure 8:
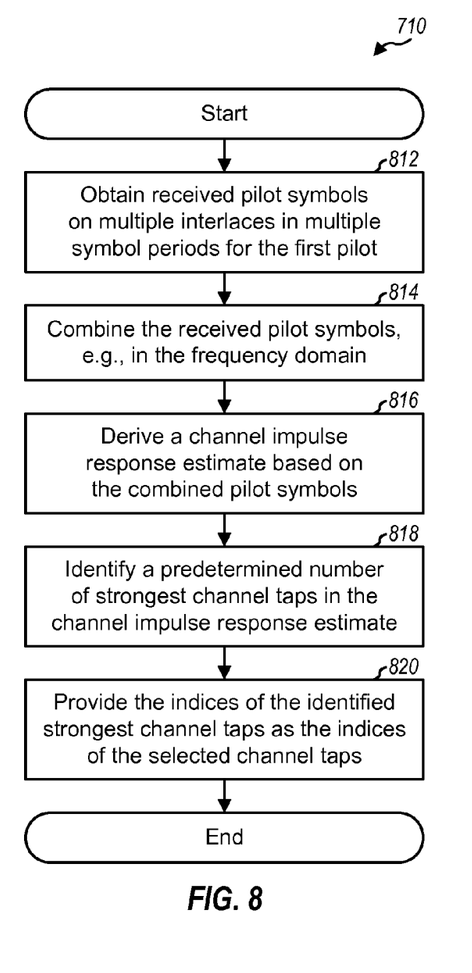
FIG. 8 shows a process to determine tap indices based on a first pilot.

FIG. 8 shows a design of block 710 in FIG. 7. Received pilot symbols are obtained on multiple interlaces in multiple symbol periods for the first pilot (block 812). The received pilot symbols may be combined in the frequency domain, e.g., using coefficients determined based on MMSE, least squares, or linear interpolation (block 814). A channel impulse response estimate may then be derived based on the combined pilot symbols (block 816). A predetermined number of strongest channel taps in the channel impulse response estimate may be identified (block 818). The indices of the identified strongest channel taps may be provided as the indices of the selected channel taps (block 820). The channel impulse response estimate may also be filtered across symbol periods, and a predetermined number of strongest channel taps in the filtered channel impulse response estimate may be identified. The interlace combining may also be performed in the time domain, as described above.

Figure 9:
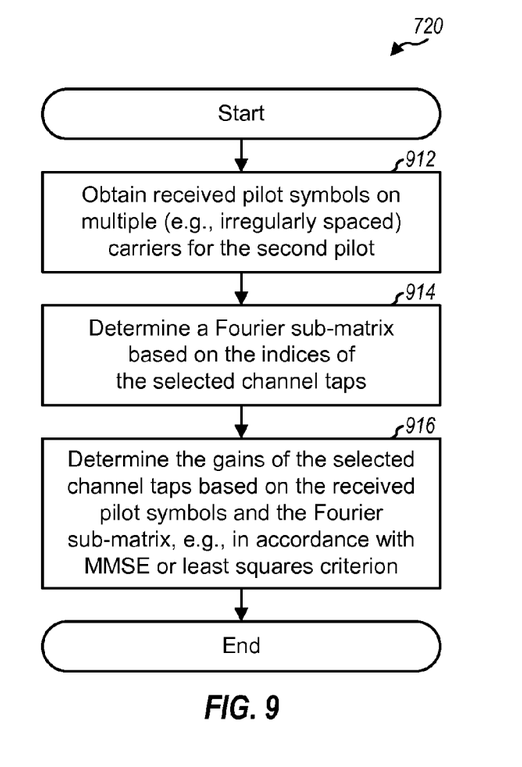
FIG. 9 shows a process to determine channel tap gains based on a second pilot.

FIG. 9 shows a design of block 720 in FIG. 7. Received pilot symbols are obtained on multiple (e.g., irregularly spaced) carriers for the second pilot (block 912). A Fourier sub-matrix is determined based on the indices of the selected channel taps (block 914). The elements of a Fourier matrix may be stored in a memory, and the Fourier sub-matrix may be formed with the stored elements for the Fourier matrix. The gains of the selected channel taps may be determined based on the received pilot symbols and the Fourier sub-matrix, e.g., in accordance with MMSE or least squares criterion (block 916).

The channel estimation techniques described herein may be implemented by various means. For example, these techniques may be implemented in hardware, firmware, software, or a combination thereof. For a hardware implementation, the processing units used to perform channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes are stored in a memory (e.g., memory 192 in FIG. 1) and executed by a processor (e.g., processor 190). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples shown herein but is to be accorded the widest scope consistent with the principles and novel features disclosed herein.

What is claimed is:

1. An apparatus comprising:
   at least one processor;
   a memory coupled to the at least one processor;
   the at least one processor configured to:
   identify, for identifying a set of selected channel taps, at least one index of a plurality of channel taps in a channel impulse response estimate based on a scattered pilot having a pilot symbol on each of a plurality of interlaces corresponding to a first plurality of carriers;
   determine gains of the selected channel taps based on a continual pilot having a pilot symbol on each of a second plurality of carriers, wherein the selected channel taps are a predetermined number of strongest channel taps;
   derive a channel frequency response estimate based on the gains of the selected channel taps;
   perform data detection with the channel frequency response estimate; and
   combine, in a frequency domain, the plurality of interlaces corresponding to the first plurality of carriers carrying the scattered pilot, wherein the combining comprises:
     receiving pilot symbols on the plurality of interlaces corresponding to the first plurality of carriers carrying the scattered pilot in a plurality of symbol periods,
     combining the received pilot symbols in frequency domain in accordance with a plurality of coefficients, and
     deriving the channel impulse response estimate based on the combined pilot symbols, wherein the coefficients determine weights applied to the plurality of interlaces for combining.

2. The apparatus of claim 1, wherein the selected channel taps are a subset of all channel taps for the channel impulse response estimate.

3. The apparatus of claim 1, wherein the scattered pilot is sent on the plurality of interlaces, wherein one interlace is in each symbol period, and each interlace corresponding to a different set of carriers.

4. The apparatus of claim 1, wherein the continual pilot is sent in each symbol period.

5. The apparatus of claim 1, wherein the second plurality of carriers are irregularly spaced.

6. The apparatus of claim 5, wherein the continual pilot further comprises a portion of the scattered pilot sent on regularly spaced carriers.

7. The apparatus of claim 1, wherein the at least one processor is configured to filter the channel impulse response estimate across the plurality of symbol periods, to identify strongest channel taps in the filtered channel impulse response estimate.

8. The apparatus of claim 1, wherein the selected channel taps in the channel impulse response estimate exceed a predetermined threshold.

9. The apparatus of claim 1, wherein the plurality of coefficients comprise coefficients for linear interpolation.

10. The apparatus of claim 1, wherein the at least one processor is configured to obtain pilot symbols on the second plurality of carriers carrying the continual pilot, to determine a Fourier sub-matrix based on indices of the selected channel taps, and to determine the gains of the selected channel taps based on the continual pilot and the Fourier sub-matrix.

11. The apparatus of claim 10, wherein the at least one processor is configured to determine the gains of the selected channel taps in accordance with minimum mean square error (MMSE) or least squares criterion.

12. The apparatus of claim 10, wherein the Fourier sub-matrix comprises a plurality of rows and a plurality of columns, the elements in the plurality of rows being determined by indices of the second plurality of carriers, and the elements in the plurality of columns being determined by the indices of the selected channel taps.

13. The apparatus of claim 10, wherein the memory is configured to store elements of a Fourier matrix, and wherein the at least one processor is configured to form the Fourier sub-matrix based on the elements of the Fourier matrix stored in the memory.

14. A method comprising:
identify, for identifying a set of selected channel taps, at least one index of a plurality of channel taps in a channel impulse response estimate based on a scattered pilot having a pilot symbol on each of a plurality of interlaces corresponding to a first plurality of carriers, wherein the selected channel taps are a predetermined number of strongest channel taps;
determining gains of the selected channel taps based on a continual pilot having a pilot symbol on each of a second plurality of carriers;
deriving a channel frequency response estimate based on the gains of the selected channel taps;
performing data detection with the channel frequency response estimate; and
combining, in a frequency domain, the plurality of interlaces corresponding to the first plurality of carriers carrying the scattered pilot, wherein the combining comprises:
receiving pilot symbols on the plurality of interlaces corresponding to the first plurality of carriers carrying the scattered pilot in a plurality of symbol periods,
combining the received pilot symbols in frequency domain in accordance with a plurality of coefficients, and
deriving the channel impulse response estimate based on the combined pilot symbols, wherein the coefficients determine weights applied to the plurality of interlaces for combining.

15. The method of claim 14, further comprising:
receiving the scattered pilot on different interlaces in different symbol periods; and
receiving the continual pilot in each symbol period on the second plurality of carriers, wherein the second plurality of carriers are irregularly spaced.

16. The method of claim 14, wherein the determining the gains of the selected channel taps comprises
obtaining pilot symbols on the second plurality of carriers carrying the continual pilot,
determining a Fourier sub-matrix based on the at least one index of the selected channel taps, and
determining the gains of the selected channel taps based on the obtained pilot symbols and the Fourier sub-matrix.

17. The method of claim 16, further comprising:
storing elements of a Fourier matrix; and
forming the Fourier sub-matrix based on the stored elements of the Fourier matrix.

18. An apparatus comprising:
a scattered pilot channel estimator for identifying a set of selected channel taps to identify at least one index of a plurality of channel taps in a channel impulse response estimate based on a scattered pilot having a pilot symbol on each of a plurality of interlaces corresponding to a first plurality of carriers for identifying a set of selected channel taps, wherein the selected channel taps are a predetermined number of strongest channel taps;
a continuous pilot channel estimator for determining gains of the selected channel taps based on a continual pilot having a pilot symbol on each of a second plurality of carriers;
a post-processor for deriving a channel frequency response estimate based on the gains of the selected channel taps and for performing data detection with the channel frequency response estimate; and
wherein the scattered pilot channel estimator further combines, in a frequency domain, the plurality of interlaces corresponding to the first plurality of carriers carrying the scattered pilot, wherein the combining comprises:
receiving pilot symbols on the plurality of interlaces corresponding to the first plurality of carriers carrying the scattered pilot in a plurality of symbol periods,
combining the received pilot symbols in frequency domain in accordance with a plurality of coefficients, and
deriving the channel impulse response estimate based on the combined pilot symbols, wherein the coefficients determine weights applied to the plurality of interlaces for combining.

19. The apparatus of claim 18, further comprising:
a fast Fourier transform/discrete Fourier transform (FFT/DFT) unit for receiving the scattered pilot on different interlaces in different symbol periods and
for receiving the continual pilot in each symbol period on the second plurality of carriers, wherein the second plurality of carriers are irregularly spaced.

20. The apparatus of claim 18, wherein the apparatus further comprises:
a receiver for obtaining pilot symbols on the second plurality of carriers carrying the continual pilot, and
a fast Fourier transform/discrete Fourier transform (FFT/DFT) unit for determining a Fourier sub-matrix based on the at least one index of the selected channel taps, wherein the continuous pilot channel estimator determines the gains of the selected channel taps based on the obtained pilot symbols and the Fourier sub-matrix.

21. The apparatus of claim 20, further comprising:
a memory for storing elements of a Fourier matrix; and
a processor for forming the Fourier sub-matrix based on the stored elements of the Fourier matrix.

22. A non-transitory processor readable media for storing instructions executable by a processor; the instructions, when executed, are operable to:
identify, for identifying a set of selected channel taps, at least one index of a plurality of channel taps in a channel impulse response estimate based on a scattered pilot having a pilot symbol on each of a plurality of interlaces corresponding to a first plurality of carriers for identifying a set of selected channel taps, wherein the selected channel taps are a predetermined number of strongest channel taps;
determine gains of the selected channel taps based on a continual pilot having a pilot symbol on each of a second plurality of carriers;
derive a channel frequency response estimate based on the gains of the selected channel taps;
perform data detection with the channel frequency response estimate; and
combine, in a frequency domain, the plurality of interlaces corresponding to the first plurality of carriers carrying the scattered pilot, wherein the combining comprises:
receiving pilot symbols on the plurality of interlaces corresponding to the first plurality of carriers carrying the scattered pilot in a plurality of symbol periods,
combining the received pilot symbols in frequency domain in accordance with a plurality of coefficients, and
deriving the channel impulse response estimate based on the combined pilot symbols, wherein the coefficients determine weights applied to the plurality of interlaces for combining.

23. The non-transitory processor readable media of claim 22, and further for storing instructions operable to:
obtain pilot symbols on the second plurality of carriers carrying the continual pilot,
determine a Fourier sub-matrix based on indices of the selected channel taps, and
determine the gains of the selected channel taps based on the obtained pilot symbols and the Fourier sub-matrix.

24. An apparatus comprising:
at least one processor;
a memory coupled to the at least one processor;
the at least one processor configured to:
identify, for identifying a set of selected channel taps, at least one index of a plurality of channel taps in a channel impulse response estimate based on a scattered pilot having a pilot symbol on each of a plurality of interlaces corresponding to a first plurality of carriers;
determine gains of the selected channel taps based on a continual pilot having a pilot symbol on each of a second plurality of carriers, wherein the selected channel taps are a predetermined number of strongest channel taps;
derive a channel frequency response estimate based on the gains of the selected channel taps;
perform data detection with the channel frequency response estimate; and
combine, in a time domain, the plurality of interlaces corresponding to the first plurality of carriers carrying the scattered pilot, wherein the combining comprises:
receiving pilot symbols in each of a plurality of symbol periods for the scattered pilot,
deriving an initial channel impulse response estimate for each symbol period based on the received pilot symbols for the each of the said plurality of symbol periods, and
filtering initial channel impulse response estimates for said plurality of symbol periods to obtain the channel impulse response estimate.

25. A method comprising:
identifying at least one index of a plurality of channel taps, for identifying a set of selected channel taps, in a channel impulse response estimate based on a scattered pilot having a pilot symbol on each of a plurality of interlaces corresponding to a first plurality of carriers, wherein the selected channel taps are a predetermined number of strongest channel taps;
determining gains of the selected channel taps based on a continual pilot having a pilot symbol on each of a second plurality of carriers;
deriving a channel frequency response estimate based on the gains of the selected channel taps;
performing data detection with the channel frequency response estimate; and
combining, in a frequency domain, the plurality of interlaces corresponding to the first plurality of carriers carrying the scattered pilot, wherein the combining comprises:
receiving pilot symbols on the plurality of interlaces corresponding to the first plurality of carriers carrying the scattered pilot in a plurality of symbol periods,
combining the received pilot symbols in frequency domain in accordance with a plurality of coefficients, and
deriving the channel impulse response estimate based on the combined pilot symbols, wherein the coefficients determine weights applied to the plurality of interlaces for combining.

26. An apparatus comprising:
a scattered pilot channel estimator for identifying a set of selected channel taps to identify at least one index of a plurality of channel taps in a channel impulse response estimate based on a scattered pilot having a pilot symbol on each of a plurality of interlaces corresponding to a first plurality of carriers for identifying a set of selected channel taps, wherein the selected channel taps are a predetermined number of strongest channel taps;
a continuous pilot channel estimator for determining gains of the selected channel taps based on a continual pilot having a pilot symbol on each of a second plurality of carriers;
a post-processor for deriving a channel frequency response estimate based on the gains of the selected channel taps and for performing data detection with the channel frequency response estimate; and
wherein the scattered pilot channel estimator further combines the scattered pilot interlaces in a time domain, wherein combining in the time domain comprises:
receiving pilot symbols in each of a plurality of symbol periods for the scattered pilot,
deriving an initial channel impulse response estimate for each symbol period based on the received pilot symbols for the each of the said plurality of symbol periods, and
filtering initial channel impulse response estimates for said plurality of symbol periods to obtain the channel impulse response estimate.

27. A non-transitory processor readable media for storing instructions executable by a processor; the instructions, when executed, are operable to:
identify, for identifying a set of selected channel taps, at least one index of a plurality of channel taps in a channel impulse response estimate based on a scattered pilot having a pilot symbol on each of a plurality of interlaces corresponding to a first plurality of carriers;

determine gains of the selected channel taps based on a continual pilot having a pilot symbol on each of a second plurality of carriers, wherein the selected channel taps are a predetermined number of strongest channel taps;

derive a channel frequency response estimate based on the gains of the selected channel taps;

perform data detection with the channel frequency response estimate; and combine, in a time domain, the plurality of interlaces corresponding to the first plurality of carriers carrying the scattered pilot, wherein the combining comprises:

receiving pilot symbols in each of a plurality of symbol periods for the scattered pilot, deriving an initial channel impulse response estimate for each symbol period based on the received pilot symbols for the each of the said plurality of symbol periods, and filtering initial channel impulse response estimates for said plurality of symbol periods to obtain the channel impulse response estimate.

* * * * *